(12) United States Patent     (10) Patent No.:   US 12,689,044 B2

Her et al.        (45) Date of Patent:     Jul. 21, 2026

(54) HUMIDIFIER FOR FUEL CELL

(71) Applicant: KOLON INDUSTRIES, INC., Seoul (KR)

(72) Inventors: Jung Kun Her, Seoul (KR); Woong Jeon Ahn, Seoul (KR); Do Woo Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 538 days.

(21) Appl. No.: 18/260,046

(22) PCT Filed: Dec. 30, 2021

(86) PCT No.: PCT/KR2021/020247

§ 371 (c)(1),
(2) Date: Jun. 30, 2023

(87) PCT Pub. No.: WO2022/149794

PCT Pub. Date: Jul. 14, 2022

(65) Prior Publication Data

US 2024/0063406 A1     Feb. 22, 2024

(30) Foreign Application Priority Data

Jan. 8, 2021    (KR) ........................ 10-2021-0002481

(51) Int. Cl.
*H01M 8/04119*     (2016.01)
(52) U.S. Cl.
CPC .............................. *H01M 8/04149* (2013.01)
(58) Field of Classification Search
None
See application file for complete search history.

(56) References Cited

U.S. PATENT DOCUMENTS

2007/0210463 A1   9/2007   Koenig
2011/0000842 A1   1/2011   Takagi
(Continued)

FOREIGN PATENT DOCUMENTS

KR    20160061988 A    6/2016
KR    20190035002 A   *   4/2019   ........ H01M 8/04149
(Continued)

OTHER PUBLICATIONS

The office action dated Jul. 16, 2024 related to the corresponding Korean Patent application.

*Primary Examiner* — Maria Laios
*Assistant Examiner* — Jordan E Berresford
(74) *Attorney, Agent, or Firm* — Harvest IP Law, LLP

(57) ABSTRACT

The present invention relates to a humidifier for a fuel cell, comprising: a humidifying module for humidifying dry gas supplied from the outside, by using wet gas discharged from a fuel cell stack; a first cap coupled to one end of the humidifying module; and a second cap coupled to the other end of the humidifying module, in which the humidifier comprises a first packing member which is airtightly coupled to one end of the humidifying module through mechanical assembly, so that the first cap can be in fluid communication only with hollow fiber membranes, wherein the humidifying module comprises a first sub-case having a first insertion groove into which the first packing member is inserted.

11 Claims, 8 Drawing Sheets

(56)           References Cited

U.S. PATENT DOCUMENTS

2014/0054804  A1      2/2014  Kim
2020/0161678  A1*    5/2020  Bauer  ...............  H01M 8/04149

FOREIGN PATENT DOCUMENTS

KR         20190081736  A      7/2019
KR         20200122260  A     10/2020
WO     WO-2016208878  A1  *  12/2016   ........  H01M 8/04141

* cited by examiner

- Prior Art -

HUMIDIFIER FOR FUEL CELL

CROSS REFERENCE TO RELATED APPLICATION(S)

This application is a National Stage of International Application No. PCT/KR2021/020247 filed on Dec. 30, 2021, claiming priority based on Korean Patent Application No. 10-2021-0002481 filed on Jan. 8, 2021, the disclosure of which is incorporated herein by reference in their entirety.

TECHNICAL FIELD

The present disclosure relates to a humidifier for fuel cells configured to supply humidified gas to a fuel cell.

BACKGROUND ART

A fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may generally be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, if the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane or the proton exchange membrane.

Among these methods, the membrane humidification method, which provides water vapor to air that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier.

When a module is formed, a hollow fiber membrane having large transmission area per unit volume is suitable for a permselective membrane used in the membrane humidification method. That is, when a humidifier is manufactured using a hollow fiber membrane, high integration of the hollow fiber membrane having large contact surface area is possible, whereby it is possible to sufficiently humidify the fuel cell even at a small capacity, it is possible to use a low-priced material, and it is possible to collect moisture and heat included in off-gas discharged from the fuel cell at a high temperature and to reuse the collected moisture and heat through the humidifier.

FIG. 1 is a schematic exploded perspective view of a conventional humidifier for fuel cells.

As illustrated in FIG. 1, a conventional membrane humidification type humidifier 100 includes a humidifying module 110, in which moisture exchange is performed between air supplied from the outside and off-gas discharged from a fuel cell stack (not shown), and caps 120 coupled respectively to opposite ends of the humidifying module 110.

One of the caps 120 transmits air supplied from the outside to the humidifying module 110, and the other cap transmits air humidified by the humidifying module 110 to the fuel cell stack.

The humidifying module 110 includes a mid-case 111 having an off-gas inlet 111a and an off-gas outlet 111b and a plurality of hollow fiber membranes 112 in the mid-case 111. Opposite ends of a bundle of hollow fiber membranes 112 are potted in fixing layers 113. In general, each of the fixing layers 113 is formed by hardening a liquid polymer, such as liquid polyurethane resin, using a casting method.

Air supplied from the outside flows along hollows of the hollow fiber membranes 112. Off-gas introduced into the mid-case 111 through the off-gas inlet 111a comes into contact with outer surfaces of the hollow fiber membranes 112, and is discharged from the mid-case 111 through the off-gas outlet 111b. When the off-gas comes into contact with the outer surfaces of the hollow fiber membranes 112, moisture contained in the off-gas is transmitted through the hollow fiber membranes 112 to humidify air flowing along the hollows of the hollow fiber membranes 112.

Inner spaces of the caps 120 must fluidly communicate with only the hollows of the hollow fiber membranes 112 in a state of being completely isolated from an inner space of the mid-case 111. If not, air leakage occurs due to pressure difference, whereby the amount of humidified air that is supplied to the fuel cell stack is reduced, and therefore power generation efficiency of the fuel cell is lowered.

In general, as illustrated in FIG. 1, the fixing layers 113, in which ends of the hollow fiber membranes 112 are potted, and resin layers 114 provided between the fixing layers 113 and the mid-case 111 isolate the inner spaces of the caps 120 from the inner space of the mid-case 111. Similarly to the fixing layers 113, each of the resin layers 114 is generally formed by hardening a liquid polymer, such as liquid polyurethane resin, using a casting method.

However, a casting process for forming the resin layers 114 requires a relatively long process time, whereby productivity of the humidifier 100 is deteriorated.

DISCLOSURE

Technical Problem

The present disclosure has been made in view of the above problems, and it is an object of the present disclosure to provide a humidifier for fuel cells capable of preventing deterioration in productivity of the humidifier due to formation of a resin layer through a casting process.

Technical Solution

In order to accomplish the above object, the present disclosure may include the following constructions.

A humidifier for fuel cells according to the present disclosure may include a humidifying module configured to humidify dry gas supplied from the outside using wet gas discharged from a fuel cell stack, a first cap coupled to one end of the humidifying module, and a second cap coupled to the other end of the humidifying module. The humidifying module may include a mid-case and at least one cartridge disposed in the mid-case, the cartridge being configured to receive a plurality of hollow fiber membranes. The cartridge may include an inner case having the hollow fiber membranes received therein, a first potting layer configured to fix one end of each of the hollow fiber membranes, and a first sub-case disposed so as to abut one end of the inner case and the first potting layer.

The humidifier for fuel cells according to the present disclosure may further include a first packing member airtightly coupled to the one end of the humidifying module through mechanical assembly such that the first cap fluidly communicates with only the hollow fiber membranes. The first sub-case may include a first insertion groove configured to allow the first packing member to be inserted thereinto. The first packing member may include a first packing body configured to isolate the mid-case and the inner case from each other and a first projecting member formed so as to project from the first packing body, the first projecting member being configured to be inserted into the first insertion groove.

Advantageous Effects

The present disclosure is implemented such that a casting process for hermetically sealing an inner space of a cap and an inner space of a mid-case is omitted. In the present disclosure, therefore, it is possible to shorten process time for production, and therefore it is possible to improve productivity.

The present disclosure is implemented to prevent leakage of both dry gas and wet gas through an airtight structure implemented as the result of a first packing member being inserted into a first sub-case. In the present disclosure, therefore, it is possible to implement a bidirectional sealing structure, whereby it is possible to increase sealing force, and therefore it is possible to improve humidification performance.

BEST MODE

Hereinafter, an embodiment of a humidifier for fuel cells according to the present disclosure will be described in detail with reference to the accompanying drawings.

Figure 1:
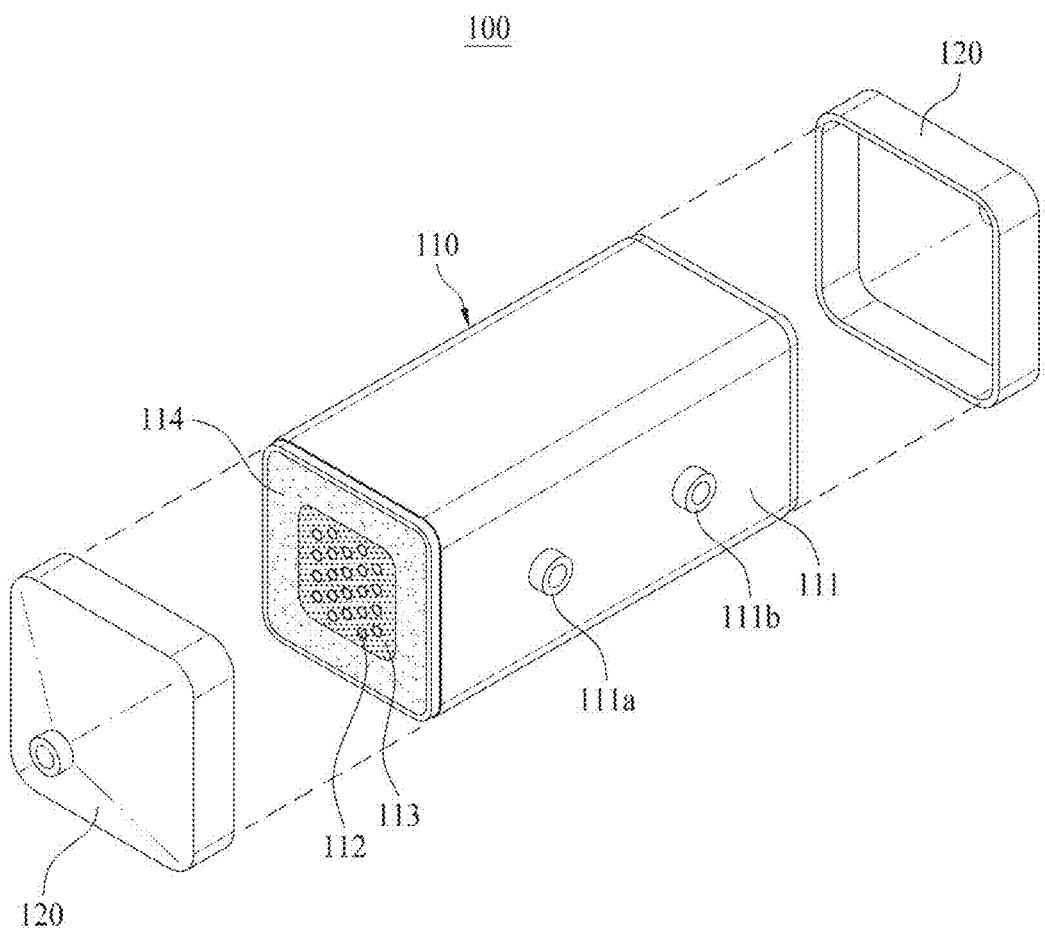
FIG. 1 is a schematic exploded perspective view of a conventional humidifier for fuel cells.
Figure 2:
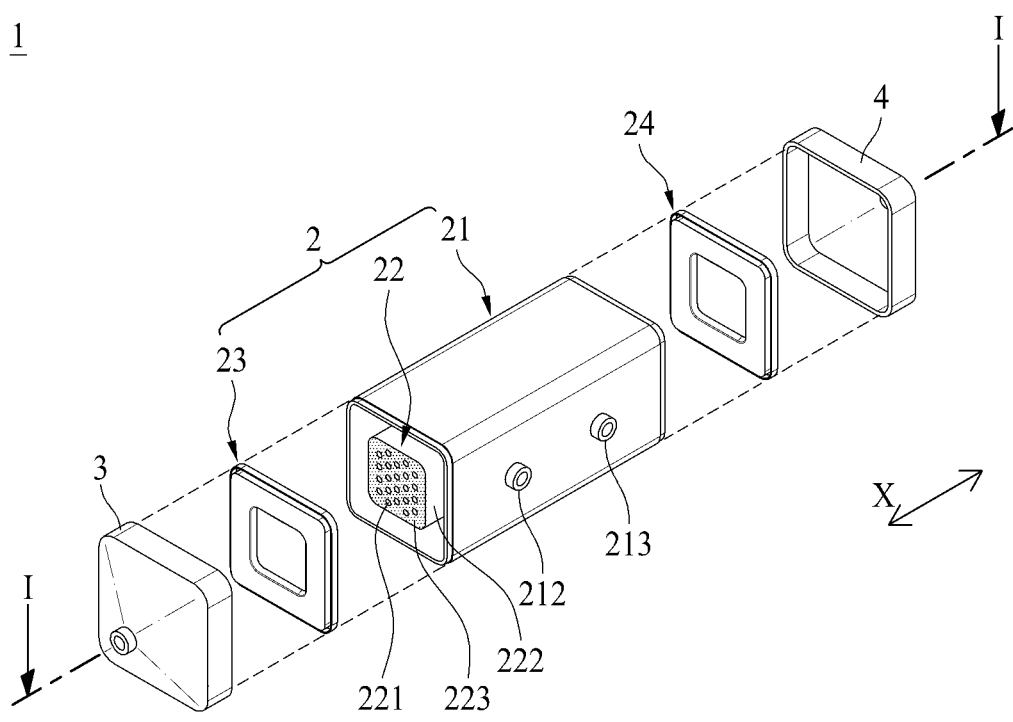
FIG. 2 is a schematic exploded perspective view of a humidifier for fuel cells according to the present disclosure.
Figure 3:
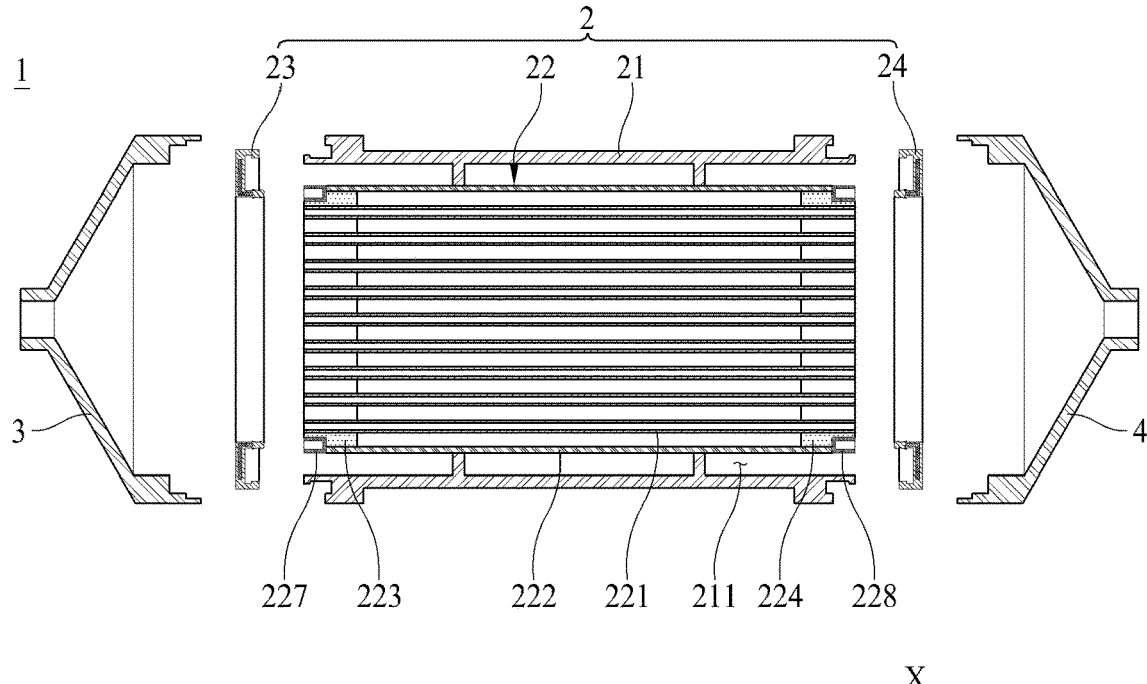
FIG. 3 is a schematic exploded sectional view showing the humidifier for fuel cells according to the present disclosure, taken along line I-I of FIG. 2.
Figure 4:
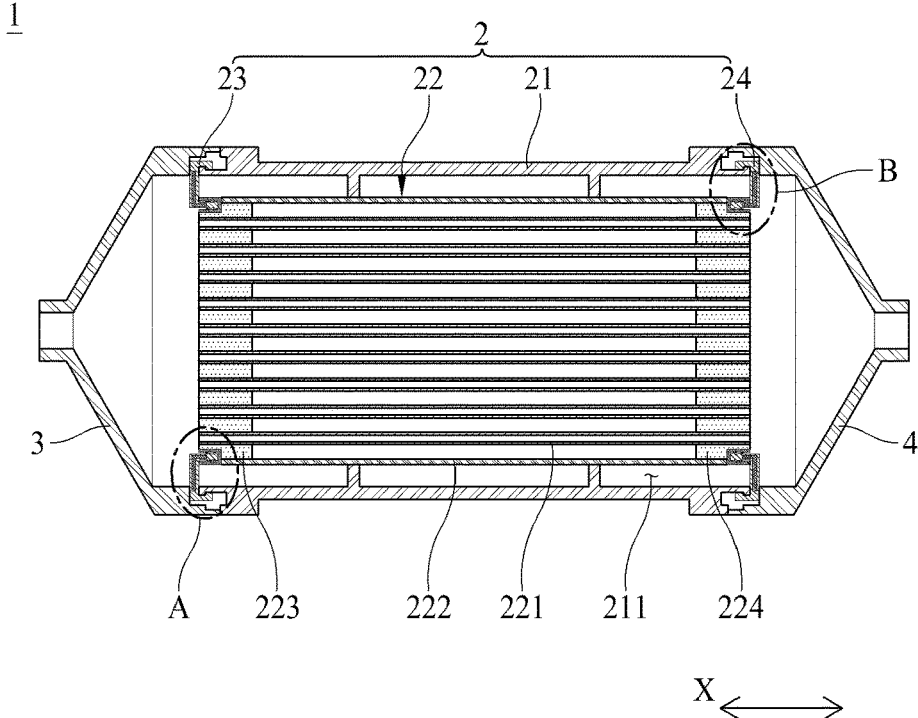
FIG. 4 is a schematic coupled sectional view showing the humidifier for fuel cells according to the present disclosure, taken along line I-I of FIG. 2.

Referring to FIGS. 2 to 4, a humidifier 1 for fuel cells according to the present disclosure is configured to humidify dry gas supplied from the outside using wet gas discharged from a fuel cell stack (not shown). The dry gas may be fuel gas or air. The dry gas may be humidified by the wet gas, and may be supplied to the fuel cell stack. The humidifier 1 for fuel cells according to the present disclosure includes a humidifying module 2 configured to humidify dry gas, a first cap 3 coupled to one end of the humidifying module 2, and a second cap 4 coupled to the other end of the humidifying module 2.

Referring to FIGS. 2 to 4, the humidifying module 2 humidifies dry gas supplied from the outside. The first cap 3 may be coupled to one end of the humidifying module 2. The second cap 4 may be coupled to the other end of the humidifying module 2. The first cap 3 may transmit dry gas to the humidifying module 2. In this case, the second cap 4 may transmit dry gas humidified by wet gas in the humidifying module 2 to the fuel cell stack. The first cap 3 may transmit wet gas to the humidifying module 2. In this case, the second cap 4 may discharge wet gas to the outside after dry gas is humidified in the humidifying module 2.

The humidifying module 2 includes a mid-case 21 and at least one cartridge 22.

The cartridge 22 is coupled to the mid-case 21. The cartridge 22 may be disposed in the mid-case 21. Opposite ends of the mid-case 21 are open. In this case, a receiving hole 211 may be formed in the mid-case 21. The receiving hole 211 may be formed so as to extend through the mid-case 21 in a first axis direction (X-axis direction).

A first gas inlet 212 and a first gas outlet 213 may be formed at the mid-case 21. The first gas inlet 212 may allow wet gas or dry gas to be introduced into the mid-case 21 therethrough. The first gas outlet 213 may allow wet gas or dry gas to be discharged from the mid-case 21 therethrough. The first gas inlet 212 and the first gas outlet 213 may be disposed spaced apart from each other in the first axis direction (X-axis direction).

When wet gas flows through the first gas inlet 212 and the first gas outlet 213, the wet gas may be supplied into the cartridge 22 via the interior of the mid-case 21 through the first gas inlet 212, and may come into contact with outer surfaces of hollow fiber membranes 221. During this process, moisture contained in the wet gas may be transmitted through the hollow fiber membranes 221 to humidify dry gas flowing along hollows of the hollow fiber membranes 221. The humidified dry gas may be discharged from the hollow fiber membranes 221, and may be supplied to the fuel cell stack through the second cap 4. After humidifying the dry gas, the wet gas may be discharged from the cartridge 22, may flow through the interior of the mid-case 21, and may discharged from the mid-case 21 through the first gas outlet 213. The first gas inlet 212 may be connected to the fuel cell stack such that wet gas is supplied thereto. In this case, the wet gas may be off-gas discharged from the fuel cell stack.

When dry gas flows through the first gas inlet 212 and the first gas outlet 213, the dry gas may be supplied into the cartridge 22 via the interior of the mid-case 21 through the first gas inlet 212, and may come into contact with the outer surfaces of the hollow fiber membranes 221 of the cartridge 22. During this process, moisture in wet gas flowing along the hollows of the hollow fiber membranes 221 may be transmitted through the hollow fiber membranes 221 to humidify the dry gas introduced into the cartridge 22. The humidified dry gas may be discharged from the cartridge 22, may flow through the interior of the mid-case 21, may be discharged from the mid-case 21 through the first gas outlet 213, and may be supplied to the fuel cell stack. After humidifying the dry gas, the wet gas may be discharged from the hollow fiber membranes 221, and may be discharged to the outside through the second cap 4. In this case, the wet gas may be off-gas discharged from the fuel cell stack.

The first gas inlet 212 and the first gas outlet 213 may project from the mid-case 21. The first gas inlet 212 and the first gas outlet 213 may project from the mid-case 21 in the same direction. The first gas inlet 212 and the first gas outlet 213 may also project from the mid-case 21 in different directions. The first gas inlet 212, the first gas outlet 213, and the mid-case 21 may be integrally formed.

The cartridge 22 is disposed in the mid-case 21, and includes a plurality of hollow fiber membranes 221. The hollow fiber membranes 221 may be coupled to the cartridge 22 so as to be modularized. Consequently, the hollow fiber membranes 221 may be installed in the mid-case 21 through a process of coupling the cartridge 22 to the mid-case 21. In the humidifier 1 for fuel cells according to the present disclosure, therefore, ease in installation, separation, and replacement of the hollow fiber membranes 221 may be improved.

The cartridge 22 may include an inner case 222.

The inner case 222 has openings formed in ends thereof, and the hollow fiber membranes 221 are received in the inner case. The hollow fiber membranes 221 may be disposed in the inner case 222 so as to be modularized. The hollow fiber membranes 221 may include a polymer membrane made of polysulfone resin, polyethersulfone resin, sulfonated polysulfone resin, polyvinylidene fluoride (PVDF) resin, polyacrylonitrile (PAN) resin, polyimide resin, polyamide imide resin, polyester imide resin, or a mixture of two or more thereof.

The cartridge 22 may include a first potting layer 223. The first potting layer 223 is configured to fix one end of each of the hollow fiber membranes 221. In this case, the first potting layer 223 may be formed so as not to block the hollows of the hollow fiber membranes 221. The first potting layer 223 may be formed by hardening a liquid resin, such as liquid polyurethane resin, through a casting process. The first potting layer 223 may fix one end of each of the hollow fiber membranes 221 to the inner case 222.

The cartridge 22 may include a second potting layer 224. The second potting layer 224 is configured to fix the other end of each of the hollow fiber membranes 221. In this case, the second potting layer 224 may be formed so as not to block the hollows of the hollow fiber membranes 221. Consequently, dry gas or wet gas may be supplied to the hollows of the hollow fiber membranes 221 without being disturbed by the second potting layer 224 and the first potting layer 223, and may be discharged from the hollows of the hollow fiber membranes 221 without being disturbed by the second potting layer 224 and the first potting layer 223. The second potting layer 224 may be formed by hardening a liquid resin, such as liquid polyurethane resin, through a casting process. The second potting layer 224 may fix the other end of each of the hollow fiber membranes 221 to the inner case 222.

The cartridge 22 may include a second gas inlet 225 and a second gas outlet 226.

Figure 5:
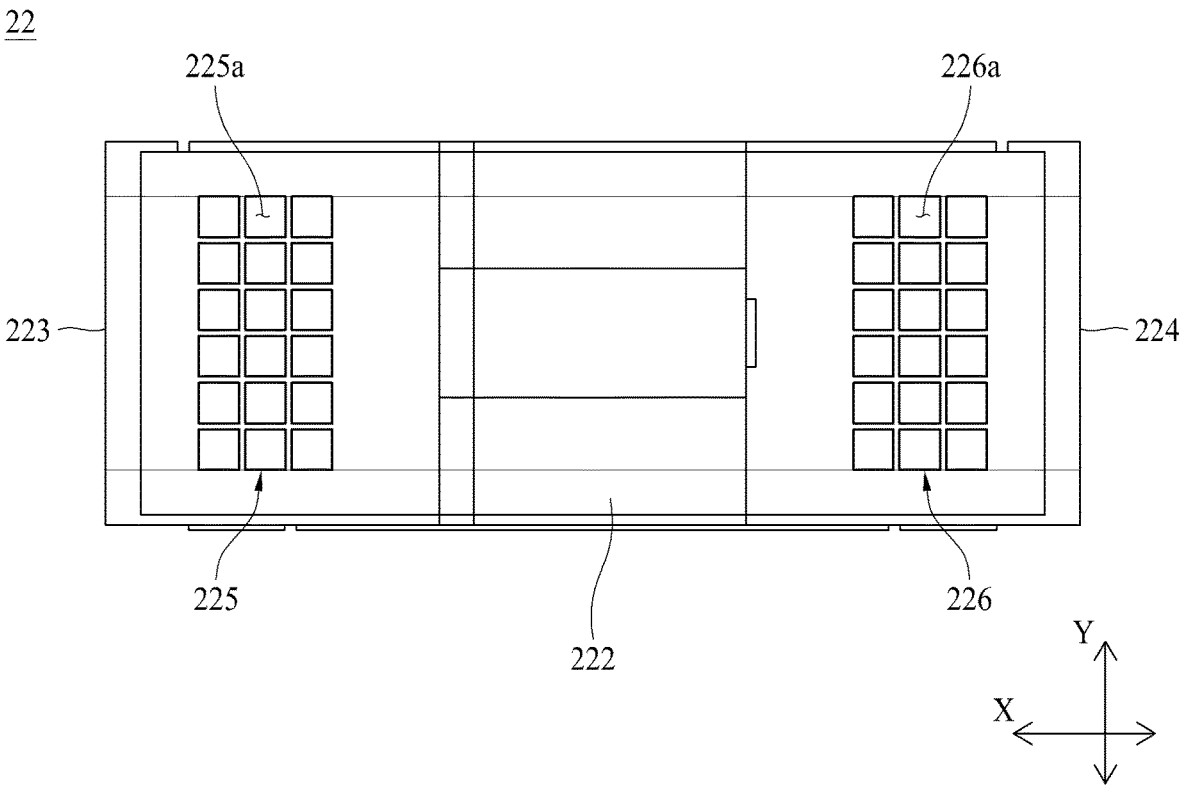
FIG. 5 is a schematic plan view of a cartridge in the humidifier for fuel cells according to the present disclosure.
Figure 6:
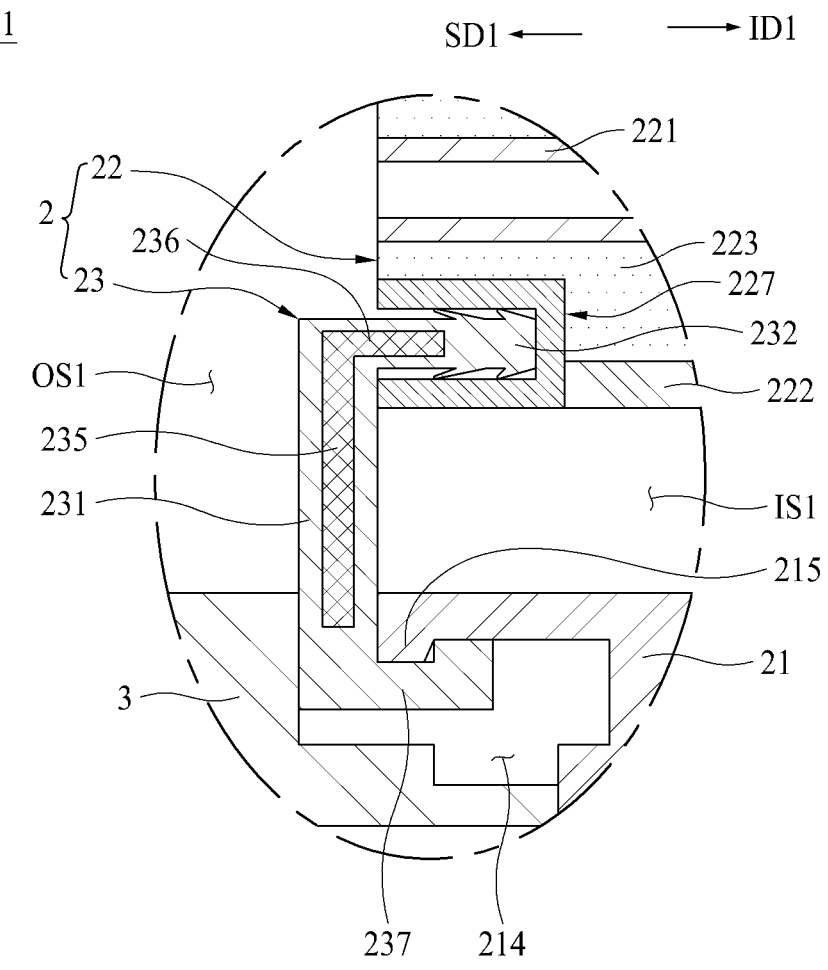
FIG. 6 is a schematic enlarged sectional view of part A of FIG. 4.
Figure 7:
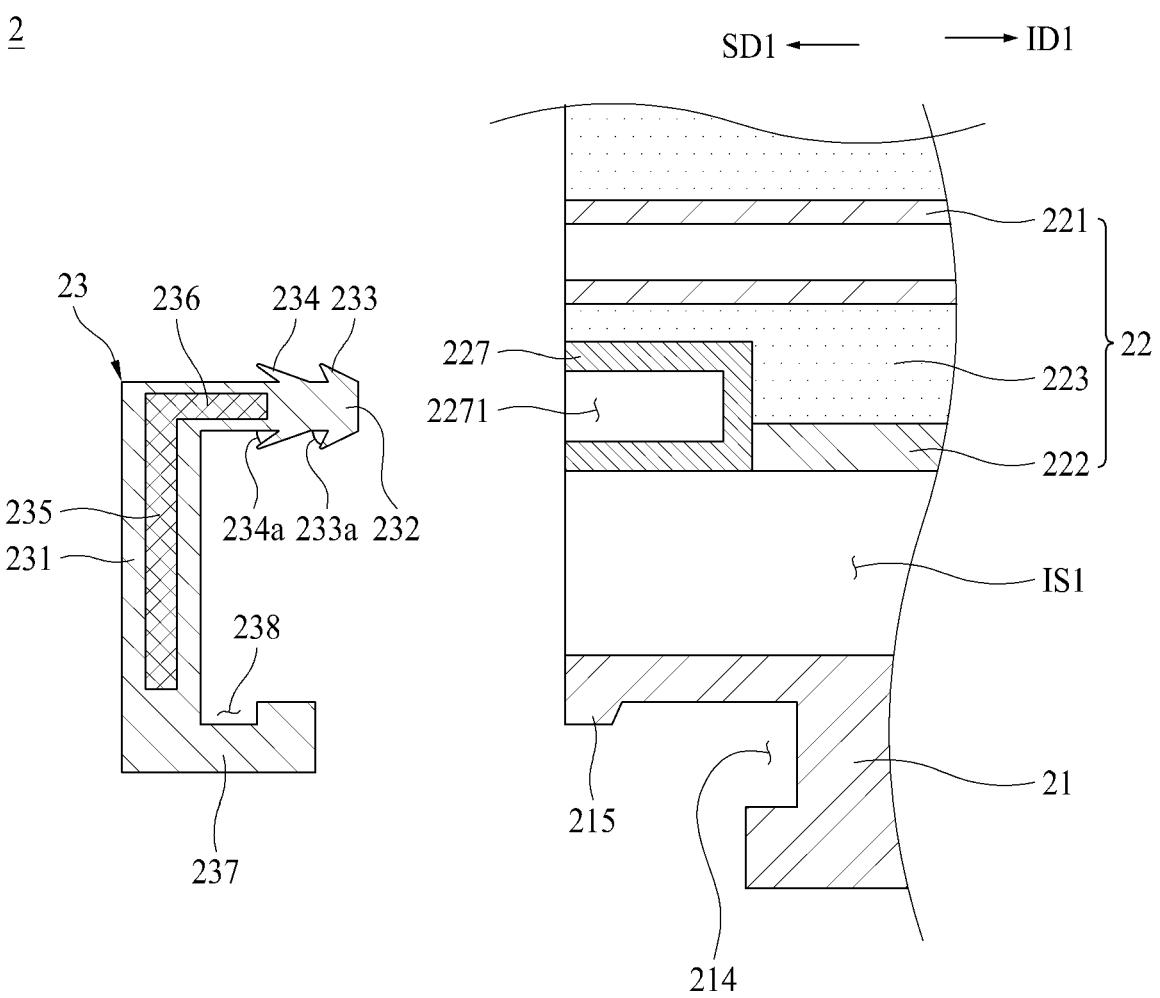
FIG. 7 is a schematic exploded sectional view showing the state in which a first packing member is separated from a humidifying module based on line I-I of FIG. 2 in the humidifier for fuel cells according to the present disclosure.
Figure 8:
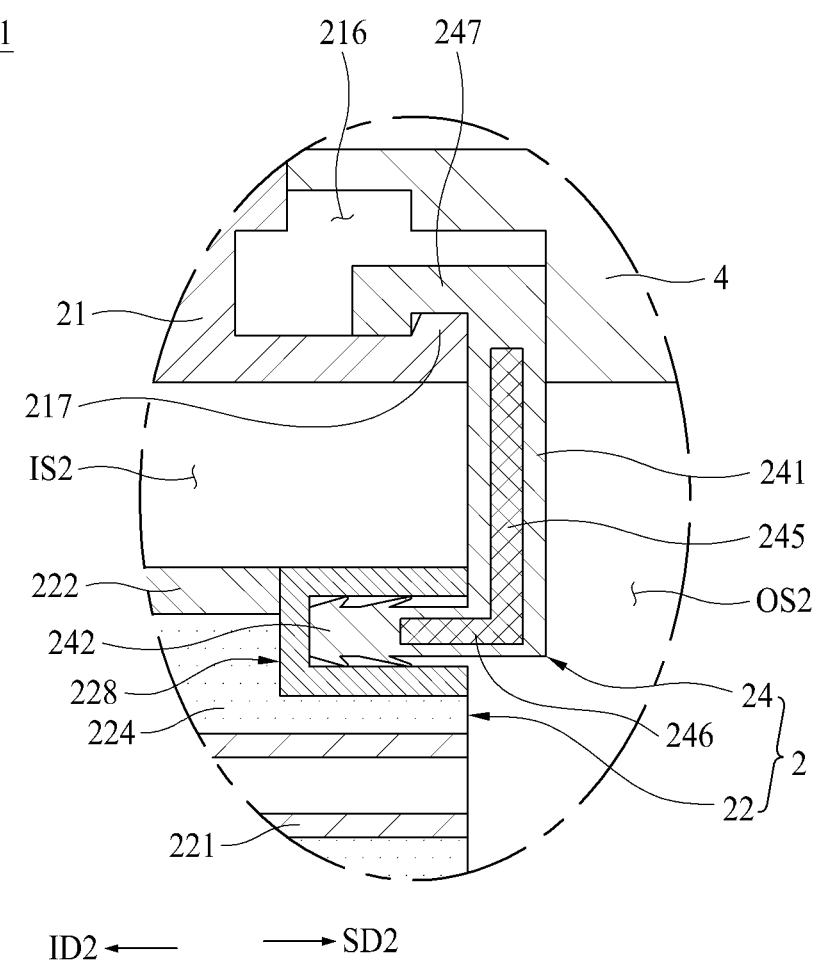
FIG. 8 is a schematic enlarged sectional view of part B of FIG. 4.
Figure 9:
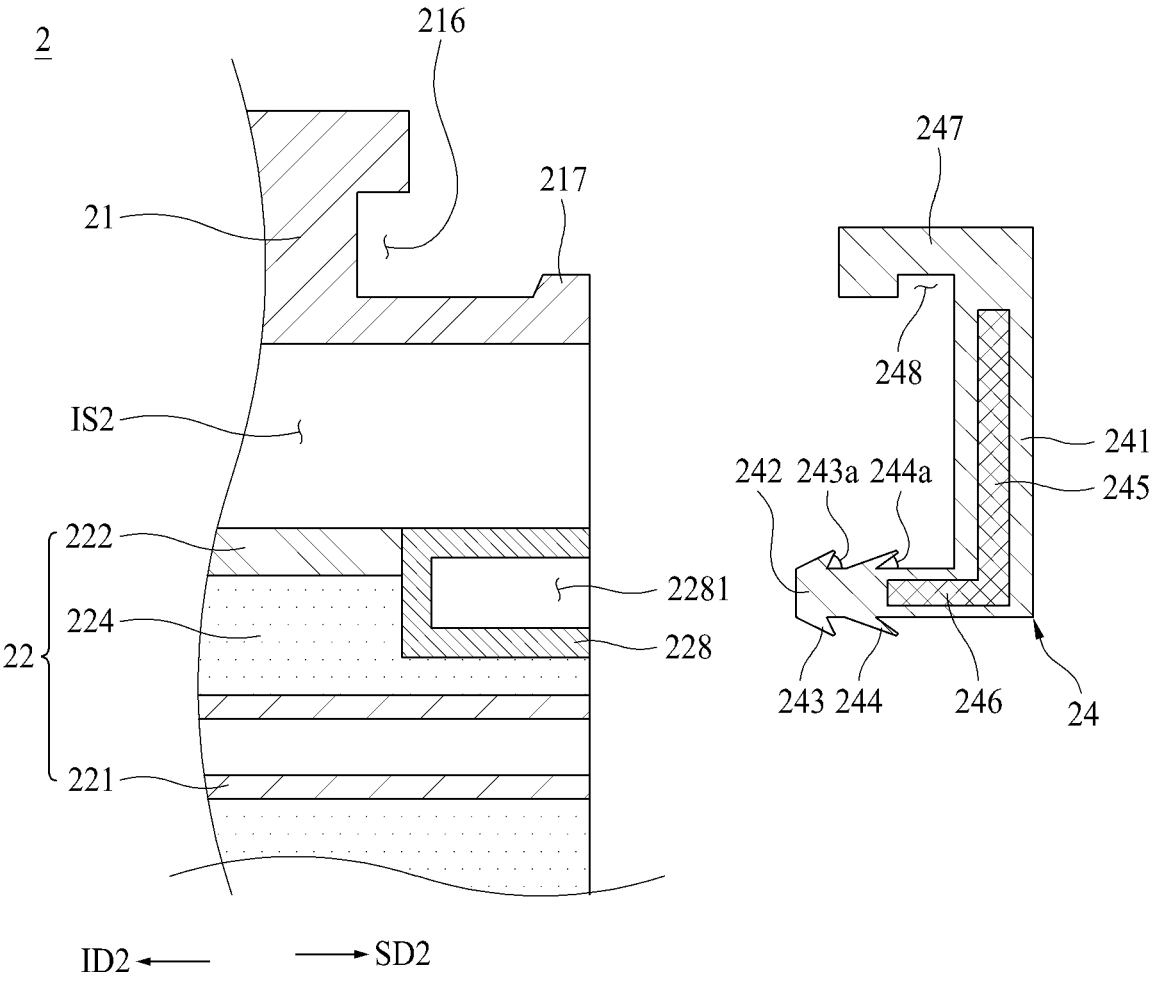
FIG. 9 is a schematic exploded sectional view showing the state in which a second packing member is separated from the humidifying module based on line I-I of FIG. 2 in the humidifier for fuel cells according to the present disclosure.

The second gas inlet 225 is formed at the inner case 222. The second gas inlet 225 may be formed at one side of the inner case 222. For example, one side of the inner case 222 may be an upper surface. The second gas inlet 225 may allow wet gas or dry gas to be introduced into the inner case 222 therethrough. The second gas inlet 225 may be formed through the inner case 222. The second gas inlet 225 may be implemented by one through-hole formed through the inner case 222. As shown in FIG. 5, the second gas inlet 225 may be implemented by a plurality of through-holes formed through the inner case 222. In this case, the second gas inlet 225 may include a plurality of inflow windows 225a formed through different parts of the inner case 222. The inflow windows 225a may be disposed spaced apart from each other in the first axis direction (X-axis direction) and a second axis direction (Y-axis direction) so as to form a matrix. The second axis direction (Y-axis direction) is an axial direction perpendicular to the first axis direction (X-axis direction).

The second gas outlet 226 is formed at the inner case 222. The second gas outlet 226 may be formed at one side of the inner case 222. The second gas outlet 226 may allow wet gas or dry gas to be discharged from the inner case 222 therethrough. The second gas outlet 226 may be formed through the inner case 222. The second gas outlet 226 may be implemented by one through-hole formed through the inner case 222. As shown in FIG. 5, the second gas outlet 226 may be implemented by a plurality of through-holes formed through the inner case 222. In this case, the second gas outlet 226 may include a plurality of outflow windows 226a formed through different parts of the inner case 222. The outflow windows 226a may be disposed spaced apart from each other in the first axis direction (X-axis direction) and the second axis direction (Y-axis direction) so as to form a matrix. The second gas outlet 226 and the second gas inlet 225 may be disposed spaced apart from each other in the first axis direction (X-axis direction).

When wet gas flows through the second gas outlet 226 and the second gas inlet 225, the wet gas may be supplied to a space between an inner surface of the mid-case 21 and an outer surface of the inner case 222 through the first gas inlet 212, may be supplied into the inner case 222 through the second gas inlet 225, and may come into contact with the outer surfaces of the hollow fiber membranes 221. During this process, moisture contained in the wet gas may be transmitted through the hollow fiber membranes 221 to humidify dry gas flowing along the hollows of the hollow fiber membranes 221. The humidified dry gas may be discharged from the hollow fiber membranes 221, and may be supplied to the fuel cell stack through the second cap 4. After humidifying the dry gas, the wet gas may be discharged to the space between the outer surface of the inner case 222 and the inner surface of the mid-case 21 through the second gas outlet 226, and may be discharged from the mid-case 21 through the first gas outlet 213.

When dry gas flows through the second gas outlet 226 and the second gas inlet 225, the dry gas may be supplied to the space between the inner surface of the mid-case 21 and the outer surface of the inner case 222 through the first gas inlet 212, may be supplied into the inner case 222 through the second gas inlet 225, and may come into contact with the outer surfaces of the hollow fiber membranes 221. During this process, moisture in wet gas flowing along the hollows of the hollow fiber membranes 221 may be transmitted through the hollow fiber membranes 221 to humidify the dry gas introduced into the inner case 222. The humidified dry gas may be discharged to the space between the outer surface of the inner case 222 and the inner surface of the mid-case 21 through the second gas outlet 226, may be discharged from the mid-case 21 through the first gas outlet 213, and may be supplied to the fuel cell stack. After humidifying the dry gas, the wet gas may be discharged from the hollow fiber membranes 221, and may be discharged to the outside through the second cap 4.

Referring to FIGS. 2 to 4, the first cap 3 is coupled to one end of the humidifying module 2. The first cap 3 may transmit dry gas or wet gas supplied from the outside to the humidifying module 2.

Referring to FIGS. 2 to 4, the second cap 4 is coupled to the other end of the humidifying module 2. The second cap 4 may discharge dry gas or wet gas transmitted from the humidifying module 2 to the outside. When humidified dry gas is transmitted from the humidifying module 2, the second cap 4 may transmit the humidified dry gas to the fuel cell stack.

Referring to FIGS. 2 to 7, the humidifier 1 for fuel cells according to the present disclosure may be implemented such that a seal is formed between the mid-case 21 and the cartridge 22 through mechanical assembly without a casting process. In this case, the humidifier 1 for fuel cells according to the present disclosure may include a first packing member 23.

The first packing member 23 may be airtightly coupled to one end of the humidifying module 2 through mechanical assembly. As a result, the first packing member 23 allows the first cap 3 to fluidly communicate with only the hollow fiber membranes 221. In the humidifier 1 for fuel cells according to the present disclosure, therefore, a casting process, which requires a relatively long process time, may be omitted, whereby process time for production may be shortened, and therefore it is possible to improve productivity. In this case, the first packing member 23 may hermetically isolate a first outer space OS1 and a first inner space IS1 from each other so as not to fluidly communicate with each other. The first outer space OS1 is located between the cartridge 22 and the first cap 3. Dry gas introduced into the hollow fiber membranes 221 or dry gas discharged from the hollow fiber membranes 221 may flow in the first outer space OS1. Wet gas introduced into the hollow fiber membranes 221 or wet gas discharged from the hollow fiber membranes 221 may also flow in the first outer space OS1. The first inner space IS1 is located between the cartridge 22 and the mid-case 21.

Wet gas introduced through the first gas inlet 212 or wet gas discharged through the second gas outlet 226 may flow in the first inner space IS1. The first packing member 23 may be made of an elastically deformable material. For example, the first packing member 23 may be made of rubber. The first packing member 23 may be formed in a ring shape so as to form a seal between the cartridge 22 and the mid-case 21.

When the first packing member 23 is included, the cartridge 22 may include a first sub-case 227.

The first sub-case 227 is disposed so as to abut one end of the inner case 222 and the first potting layer 223. The first sub-case 227 may be coupled to the first potting layer 223. The first sub-case 227 may be disposed so as to surround the circumference of the first potting layer 223. As a result, the first potting layer 223 may be disposed in the first sub-case 227. The first sub-case 227 may be formed in a ring shape. The first sub-case 227 may be made of a material that has greater strength than the first packing member 23. For example, the first sub-case 227 may be made of metal or plastic. The first sub-case 227 may include a first insertion groove 2271. The first insertion groove 2271 may be formed in one surface of the first sub-case 227 that faces the first cap 3. The first insertion groove 2271 may be formed along the first sub-case 227 in a ring shape.

The first packing member 23 may include a first packing body 231 and a first projecting member 232.

The first packing body 231 isolates the mid-case 21 and the inner case 222 from each other. The first packing body 231 may isolate the first outer space OS1 and the first inner space IS1 from each other so as not to fluidly communicate with each other. Mixing of wet gas and dry gas between the mid-case 21 and the inner case 222 may be prevented by the first packing body 231.

The first projecting member 232 projects from the first packing body 231. The first projecting member 232 may project from the first packing body 231 in a first insertion direction (direction indicated by arrow ID1). The first insertion direction (direction indicated by arrow ID1) is a direction from the first cap 3 to the cartridge 22. When the first packing member 23 is airtightly coupled to one end of the humidifying module 2 through mechanical assembly, the first projecting member 232 may be inserted into the first insertion groove 2271. Consequently, the humidifier 1 for fuel cells according to the present disclosure is implemented to securely form a seal between the first packing member 23 and the cartridge 22 through an airtight structure implemented as the result of the first packing member 23 being inserted into the first sub-case 227. Also, in the humidifier 1 for fuel cells according to the present disclosure, only when the wet gas and dry gas pass through a space between the first projecting member 232 and an inner case of the first sub-case 227, wet gas and dry gas may flow between the first inner space IS1 and the first outer space OS1, whereby gas leakage may occur. In the humidifier 1 for fuel cells according to the present disclosure, therefore, it is possible to increase the distance that dry gas and wet gas must move so as to leak through the airtight structure implemented as the result of the first packing member 23 being inserted into the first sub-case 227, whereby it is possible to increase force capable of preventing leakage of the dry gas and the wet gas. Also, in the humidifier 1 for fuel cells according to the present disclosure, it is possible to prevent leakage of both dry gas and wet gas through the airtight structure implemented as the result of the first packing member 23 being inserted into the first sub-case 227. In the humidifier 1 for fuel cells according to the present disclosure, it is possible to implement dual sealing in both a direction from dry gas to wet gas and a direction from wet gas to dry gas through such a bidirectional structure. Meanwhile, the first projecting member 232 may be formed in any of various shapes, such as a cylindrical shape and a rectangular parallelepiped shape.

The first insertion direction (direction indicated by arrow ID1), in which the first projecting member 232 is inserted into the first insertion groove 2271, may be implemented as the same direction as a direction in which external pressure formed in the first outer space OS1 is applied to the first packing body 231. Consequently, the humidifier 1 for fuel cells according to the present disclosure is implemented such that the first projecting member 232 is more strongly inserted into the first insertion groove 2271 by the external pressure formed in the first outer space OS1, whereby the first projecting member comes into tighter contact with the first sub-case 227, during humidification of dry gas using wet gas. In the humidifier 1 for fuel cells according to the present disclosure, therefore, it is possible to further increase sealing force through the first packing member 23 using the external pressure formed in the first outer space OS1 during humidification of dry gas using wet gas.

The first packing member 23 may include a first packing wing 233.

The first packing wing 233 projects from the first projecting member 232. When the first projecting member 232 is inserted into the first insertion groove 2271, the first packing wing 233 may be inserted into the first insertion groove 2271, whereby the first packing wing may come into tight contact with the first sub-case 227. Consequently, the sealing force of the first packing member 23 may be implemented using the first packing wing 233.

The first packing wing 233 may be implemented so as to be more easily elastically deformable than the first projecting member 232. To this end, the first packing wing 233 may be formed so as to extend while having a smaller sectional area than the first projecting member 232. The first packing wing 233 may be formed in a shape in which the sectional area of the first packing wing is gradually decreased while projecting outwards from the first projecting member 232.

The first packing wing 233 may be formed so as to extend from one end coupled to the first projecting member 232 to the other end spaced apart from the first projecting member 232 in an inclined state such that the included angle 233_a_ (see FIG. 7) between the first packing wing 233 and the first projecting member 232 is an acute angle. As a result, the first packing wing 233 may be smoothly elastically deformed in a direction in which the included angle 233_a_ is decreased during insertion of the first packing wing into the first insertion groove 2271, and may come into tight contact with an inner wall of the first sub-case 227 using restoring force in the state in which the first packing wing is located in the first insertion groove 2271. Consequently, the first packing wing 233 may be smoothly inserted into the first insertion groove 2271, and may come into tight contact with the inner wall of the first sub-case 227 after being inserted into the first insertion groove 2271, whereby it is possible to implement sealing force.

Meanwhile, since the sealing force is implemented using the first packing wing 233, the sectional area of the first projecting member 232 may be implemented so as to be less than the sectional area of the first insertion groove 2271. In the humidifier 1 for fuel cells according to the present disclosure, therefore, the first projecting member 232 may be smoothly inserted into the first insertion groove 2271, and the first packing wing 233 may also be smoothly inserted into the first insertion groove 2271 through elastic deformation thereof, whereby it is possible to improve ease in mechanical assembly of the first packing member 23. Each of the sectional area of the first projecting member 232 and the sectional area of the first insertion groove 2271 is based on an axial direction perpendicular to the first insertion direction (direction indicated by arrow ID1).

The first packing member 23 may include a second packing wing 234.

The second packing wing 234 projects from the first projecting member 232. When the first projecting member 232 is inserted into the first insertion groove 2271, the second packing wing 234 may be inserted into the first insertion groove 2271, whereby the second packing wing may come into tight contact with the first sub-case 227. Consequently, the sealing force of the first packing member 23 may be implemented using the second packing wing 234. In this case, the second packing wing 234 and the first packing wing 233 may be inserted into the first insertion groove 2271, and may come into tight contact with the first sub-case 227 in a state of being spaced apart from each other. In the humidifier 1 for fuel cells according to the present disclosure, therefore, sealing force may be implemented at different positions using the second packing wing 234 and the first packing wing 233, whereby it is possible to further increase sealing force.

The second packing wing 234 may be implemented so as to be more easily elastically deformable than the first projecting member 232. To this end, the second packing wing 234 may be formed so as to extend while having a smaller sectional area than the first projecting member 232. The second packing wing 234 may be formed in a shape in which the sectional area of the second packing wing is gradually decreased while projecting outwards from the first projecting member 232.

The second packing wing 234 may be formed so as to extend from one end coupled to the first projecting member 232 to the other end spaced apart from the first projecting member 232 in an inclined state such that the included angle 234_a_ (see FIG. 7) between the second packing wing 234 and the first projecting member 232 is an acute angle. As a result, the second packing wing 234 may be smoothly elastically deformed in a direction in which the included angle 234_a_ is decreased during insertion of the second packing wing into the first insertion groove 2271, and may come into tight contact with the inner wall of the first sub-case 227 using restoring force in the state in which the second packing wing is located in the first insertion groove 2271. Consequently, the second packing wing 234 may be smoothly inserted into the first insertion groove 2271, and may come into tight contact with the inner wall of the first sub-case 227 after being inserted into the first insertion groove 2271, whereby it is possible to implement sealing force.

The second packing wing 234 may project from the first projecting member 232 in a state of being spaced from the first packing wing 233 in a first separation direction (direction indicated by arrow SD1). The first separation direction (direction indicated by arrow SD1) and the first insertion direction (direction indicated by arrow ID1) are opposite each other in the same axial direction. In this case, the first packing wing 233 may be spaced apart from the second packing wing 234 in the first insertion direction (direction indicated by arrow ID1).

The projecting length of the second packing wing 234 from the first projecting member 232 may be implemented so as to be greater than the projecting length of the first packing wing 233 from the first projecting member 232. That is, the second packing wing 234 may project from the first projecting member 232 so as to have a larger length than the first packing wing 233. As a result, the second packing wing 234 may come into tighter contact with the inner wall of the first sub-case 227 than the first packing wing 233, whereby it is possible to implement stronger sealing force than the first packing wing 233. Meanwhile, the projecting length of the first packing wing 233 from the first projecting member 232 may be implemented so as to be less than the projecting length of the second packing wing 234 from the first projecting member 232. That is, the first packing wing 233 may project from the first projecting member 232 so as to have a smaller length than the second packing wing 234. As a result, the first packing wing 233 may be more smoothly inserted into the first insertion groove 2271 than the second packing wing 234, whereby it is possible to achieve better mechanical assemblability than the second packing wing 234.

Since the first packing member 23 is implemented by a combination of the first packing wing 233 having further improved mechanical assemblability and the second packing wing 234 having further increased sealing force, as described above, it is possible to increase sealing force at one end of the humidifying module 2 while improving ease in mechanical assembly at one end of the humidifying module 2. In this case, the first packing wing 233 is spaced apart from the second packing wing 234 in the first insertion direction (direction indicated by arrow ID1). When the first packing member 23 is mechanically assembled, therefore, the first packing wing 233 is inserted earlier into the first insertion groove 2271 than the second packing wing 234. Consequently, it is possible to further improve ease in mechanical assembly of the first packing member 23 at one end of the humidifying module 2.

The first packing member 23 may include a first reinforcing member 235.

The first reinforcing member 235 may be disposed in the first packing body 231. The first reinforcing member 235 may be formed so as to have greater strength than the first packing body 231. Consequently, the first reinforcing member 235 may prevent excessive deformation of the first packing body 231 due to the external pressure formed in the first outer space OS1. For example, the first reinforcing member 235 may be made of metal or plastic. The first reinforcing member 235 may be implemented so as to be disposed in the first packing body 231 through insert molding. The first reinforcing member 235 may be formed in a ring shape.

The first packing member 23 may include a first reinforcing protrusion 236.

The first reinforcing protrusion 236 projects from the first reinforcing member 235. The first reinforcing protrusion 236 may project from the first reinforcing member 235 toward the first projecting member 232 so as to be located in the first projecting member 232. Consequently, the first reinforcing protrusion 236 may prevent excessive deformation of the first projecting member 232 due to pressing force applied during insertion of the first projecting member 232 into the first insertion groove 2271 and the external pressure formed in the first outer space OS1. The first reinforcing protrusion 236 may be formed so as to have greater strength than the first projecting member 232. For example, the first reinforcing protrusion 236 may be made of metal or plastic. The first reinforcing protrusion 236 may be implemented so as to be disposed in the first projecting member 232 through insert molding. The first reinforcing protrusion 236 may be formed in a ring shape. The first reinforcing protrusion 236 and the first reinforcing member 235 may be integrally formed.

The first packing member 23 may include a first catching member 237.

The first catching member 237 projects from the first packing body 231. The first catching member 237 may project from the first packing body 231 in the first insertion direction (direction indicated by arrow ID1). The first catching member 237 may be disposed opposite the first projecting member 232 in the state in which the first packing body 231 is interposed therebetween. In this case, the first packing body 231 may be located between the first catching member 237 and the first projecting member 232. When the first packing member 23 includes the first catching member 237, the mid-case 21 may include a first catching groove 214 (see FIG. 6). The first catching groove 214 may be formed in an outer wall of the mid-case 21, which surrounds the cartridge 22. When the first packing member 23 is coupled to one end of the humidifying module 2 through mechanical assembly, the first catching member 237 may be inserted into the first catching groove 214. When the pressure in the first outer space OS1 is applied in the first insertion direction (direction indicated by arrow ID1), therefore, the first packing member 23 may be supported by the mid-case 21 through a catching structure using the first catching member 237, whereby it is possible to securely maintain isolation between the cartridge 22 and the mid-case 21. Each of the first catching member 237 and the first catching groove 214 may be formed in a ring shape. The first catching member 237 and the first packing body 231 may be integrally formed.

The first packing member 23 may include a first support groove 238.

The first support groove 238 is formed in the first catching member 237. The first support groove 238 may be formed in one surface of the first catching member 237 that contacts the mid-case 21. When the first packing member 23 includes the first support groove 238, the mid-case 21 may include a first support member 215. When the first packing member 23 is coupled to one end of the humidifying module 2 through mechanical assembly, the first support member 215 may be inserted into the first support groove 238 to support the first catching member 237. Even though the pressure in the first outer space OS1 is applied in the first insertion direction (direction indicated by arrow ID1), therefore, it is possible to more securely maintain isolation between the cartridge 22 and the mid-case 21 by the first packing member 23. The first support member 215 may project from one surface of the mid-case 21 that contacts the first catching member 237.

Meanwhile, when the first cap 3 is coupled to one end of the humidifying module 2 in the state in which the first packing member 23 is coupled to one end of the humidifying module 2 through mechanical assembly, the first cap 3 may press the first packing body 231 toward the mid-case 21. Even though the pressure in the first outer space OS1 is applied in the first insertion direction (direction indicated by arrow ID1), therefore, it is possible to more securely maintain isolation between the cartridge 22 and the mid-case 21 by the first packing member 23 using pressing force of the first cap 3.

Referring to FIGS. 2 to 9, the humidifier 1 for fuel cells according to the present disclosure may include a second packing member 24.

The second packing member 24 may be airtightly coupled to the other end of the humidifying module 2 through mechanical assembly. As a result, the second packing member 24 allows the second cap 4 to fluidly communicate with only the hollow fiber membranes 221. In the humidifier 1 for fuel cells according to the present disclosure, therefore, a casting process, which requires a relatively long process time, may be omitted, whereby process time for production may be shortened, and therefore it is possible to improve productivity. In this case, the second packing member 24 may hermetically isolate a second outer space OS2 and a second inner space IS2 from each other so as not to fluidly communicate with each other. The second outer space OS2 is located between the cartridge 22 and the second cap 4. Dry gas or wet gas may flow in the second outer space OS2. The second inner space IS2 is located between the cartridge 22 and the mid-case 21. Wet gas or dry gas may flow in the second inner space IS2. The second inner space IS2 and the first inner space IS1 may be spatially separated from each other by a partition (not shown). The second packing member 24 may be made of an elastically deformable material. For example, the second packing member 24 may be made of rubber. The second packing member 24 may be formed in a ring shape so as to form a seal between the cartridge 22 and the mid-case 21.

When the second packing member 24 is included, the cartridge 22 may include a second sub-case 228.

The second sub-case 228 is disposed so as to abut the other end of the inner case 222 and the second potting layer 224. The second sub-case 228 may be coupled to the second potting layer 224. The second sub-case 228 may be disposed so as to surround the circumference of the second potting layer 224. As a result, the second potting layer 224 may be disposed in the second sub-case 228. The second sub-case 228 may be formed in a ring shape. The second sub-case 228 may be made of a material that has greater strength than the second packing member 24. For example, the second sub-case 228 may be made of metal or plastic. The second sub-case 228 may include a second insertion groove 2281. The second insertion groove 2281 may be formed in one surface of the second sub-case 228 that faces the second cap 4. The second insertion groove 2281 may be formed along the second sub-case 228 in a ring shape.

The second packing member 24 may include a second packing body 241 and a second projecting member 242.

The second packing body 241 isolates the mid-case 21 and the inner case 222 from each other. The second packing body 241 may isolate the second outer space OS2 and the second inner space IS2 from each other so as not to fluidly communicate with each other. Mixing of wet gas and dry gas between the mid-case 21 and the inner case 222 may be prevented by the second packing body 241.

The second projecting member 242 projects from the second packing body 241. The second projecting member 242 may project from the second packing body 241 in a second insertion direction (direction indicated by arrow ID2). The second insertion direction (direction indicated by arrow ID2) is a direction from the second cap 4 to the cartridge 22. When the second packing member 24 is airtightly coupled to the other end of the humidifying module 2 through mechanical assembly, the second projecting member 242 may be inserted into the second insertion groove 2281. Consequently, the humidifier 1 for fuel cells according to the present disclosure is implemented to securely form a seal between the second packing member 24 and the cartridge 22 through an airtight structure implemented as the result of the second packing member 24 being inserted into the second sub-case 228. Also, in the humidifier 1 for fuel cells according to the present disclosure, only when the wet gas and dry gas pass through a space between the second projecting member 242 and an inner case of the second sub-case 228, wet gas and dry gas may flow between the second inner space IS2 and the second outer space OS2, whereby gas leakage may occur. In the humidifier 1 for fuel cells according to the present disclosure, therefore, it is possible to increase the distance that dry gas and wet gas must move so as to leak through the airtight structure implemented as the result of the second packing member 24 being inserted into the second sub-case 228, whereby it is possible to increase force capable of preventing leakage of the dry gas and the wet gas. Also, in the humidifier 1 for fuel cells according to the present disclosure, it is possible to prevent leakage of both dry gas and wet gas through the airtight structure implemented as the result of the second packing member 24 being inserted into the second sub-case 228. In the humidifier 1 for fuel cells according to the present disclosure, it is possible to implement dual sealing in both a direction from dry gas to wet gas and a direction from wet gas to dry gas through such a bidirectional structure. Meanwhile, the second projecting member 242 may be formed in any of various shapes, such as a cylindrical shape and a rectangular parallelepiped shape.

The second insertion direction (direction indicated by arrow ID2), in which the second projecting member 242 is inserted into the second insertion groove 2281, may be implemented as the same direction as a direction in which external pressure formed in the second outer space OS2 is applied to the second packing body 241. Consequently, the humidifier 1 for fuel cells according to the present disclosure is implemented such that the second projecting member 242 is more strongly inserted into the second insertion groove 2281 by the external pressure formed in the second outer space OS2, whereby the second projecting member comes into tighter contact with the second sub-case 228, during humidification of dry gas using wet gas. In the humidifier 1 for fuel cells according to the present disclosure, therefore, it is possible to further increase sealing force through the second packing member 24 using the external pressure formed in the second outer space OS2 during humidification of dry gas using wet gas.

The first packing member 23 may include a third packing wing 243.

The third packing wing 243 projects from the second projecting member 242. When the second projecting member 242 is inserted into the second insertion groove 2281, the third packing wing 243 may be inserted into the second insertion groove 2281, whereby the third packing wing may come into tight contact with the first sub-case 227. Consequently, the sealing force of the second packing member 24 may be implemented using the third packing wing 243.

The third packing wing 243 may be implemented so as to be more easily elastically deformable than the second projecting member 242. To this end, the third packing wing 243 may be formed so as to extend while having a smaller sectional area than the second projecting member 242. The third packing wing 243 may be formed in a shape in which the sectional area of the third packing wing is gradually decreased while projecting outwards from the second projecting member 242.

The third packing wing 243 may be formed so as to extend from one end coupled to the second projecting member 242 to the other end spaced apart from the second projecting member 242 in an inclined state such that the included angle 243a (see FIG. 9) between the third packing wing 243 and the second projecting member 242 is an acute angle. As a result, the third packing wing 243 may be smoothly elastically deformed in a direction in which the included angle 243a is decreased during insertion of the third packing wing into the second insertion groove 2281, and may come into tight contact with an inner wall of the second sub-case 228 using restoring force in the state in which the third packing wing is located in the second insertion groove 2281. Consequently, the third packing wing 243 may be smoothly inserted into the second insertion groove 2281, and may come into tight contact with the inner wall of the second sub-case 228 after being inserted into the second insertion groove 2281, whereby it is possible to implement sealing force.

Meanwhile, since the sealing force is implemented using the third packing wing 243, the sectional area of the second projecting member 242 may be implemented so as to be less than the sectional area of the second insertion groove 2281. In the humidifier 1 for fuel cells according to the present disclosure, therefore, the second projecting member 242 may be smoothly inserted into the second insertion groove 2281, and the third packing wing 243 may also be smoothly inserted into the second insertion groove 2281 through elastic deformation thereof, whereby it is possible to improve ease in mechanical assembly of the second packing member 24. Each of the sectional area of the second projecting member 242 and the sectional area of the second insertion groove 2281 is based on an axial direction perpendicular to the second insertion direction (direction indicated by arrow ID2).

The second packing member 24 may include a fourth packing wing 244.

The fourth packing wing 244 projects from the second projecting member 242. When the second projecting member 242 is inserted into the second insertion groove 2281, the fourth packing wing 244 may be inserted into the second insertion groove 2281, whereby the second packing wing may come into tight contact with the second sub-case 228. Consequently, the sealing force of the second packing member 24 may be implemented using the fourth packing wing 244. In this case, the fourth packing wing 244 and the third packing wing 243 may be inserted into the second insertion groove 2281, and may come into tight contact with the second sub-case 228 in a state of being spaced apart from each other. In the humidifier 1 for fuel cells according to the present disclosure, therefore, sealing force may be implemented at different positions using the fourth packing wing 244 and the third packing wing 243, whereby it is possible to further increase sealing force.

The fourth packing wing 244 may be implemented so as to be more easily elastically deformable than the second projecting member 242. To this end, the fourth packing wing 244 may be formed so as to extend while having a smaller sectional area than the second projecting member 242. The fourth packing wing 244 may be formed in a shape in which the sectional area of the fourth packing wing is gradually decreased while projecting outwards from the second projecting member 242.

The fourth packing wing 244 may be formed so as to extend from one end coupled to the second projecting member 242 to the other end spaced apart from the second projecting member 242 in an inclined state such that the included angle 244*a* (see FIG. 9) between the fourth packing wing 244 and the second projecting member 242 is an acute angle. As a result, the fourth packing wing 244 may be smoothly elastically deformed in a direction in which the included angle 244*a* is decreased during insertion of the fourth packing wing into the second insertion groove 2281, and may come into tight contact with the inner wall of the second sub-case 228 using restoring force in the state in which the second packing wing is located in the second insertion groove 2281. Consequently, the fourth packing wing 244 may be smoothly inserted into the second insertion groove 2281, and may come into tight contact with the inner wall of the second sub-case 228 after being inserted into the second insertion groove 2281, whereby it is possible to implement sealing force.

The fourth packing wing 244 may project from the second projecting member 242 in a state of being spaced from the third packing wing 243 in a second separation direction (direction indicated by arrow SD2). The second separation direction (direction indicated by arrow SD2) and the second insertion direction (direction indicated by arrow ID2) are opposite each other in the same axial direction. In this case, the third packing wing 243 may be spaced apart from the fourth packing wing 244 in the second insertion direction (direction indicated by arrow ID2).

The projecting length of the fourth packing wing 244 from the second projecting member 242 may be implemented so as to be greater than the projecting length of the third packing wing 243 from the second projecting member 242. That is, the fourth packing wing 244 may project from the second projecting member 242 so as to have a larger length than the third packing wing 243. As a result, the fourth packing wing 244 may come into tighter contact with the inner wall of the second sub-case 228 than the third packing wing 243, whereby it is possible to implement stronger sealing force than the third packing wing 243. Meanwhile, the projecting length of the third packing wing 243 from the second projecting member 242 may be implemented so as to be less than the projecting length of the fourth packing wing 244 from the second projecting member 242. That is, the third packing wing 243 may project from the second projecting member 242 so as to have a smaller length than the fourth packing wing 244. As a result, the third packing wing 243 may be more smoothly inserted into the second insertion groove 2281 than the fourth packing wing 244, whereby it is possible to achieve better mechanical assemblability than the fourth packing wing 244.

Since the second packing member 24 is implemented by a combination of the third packing wing 243 having further improved mechanical assemblability and the fourth packing wing 244 having further increased sealing force, as described above, it is possible to increase sealing force at the other end of the humidifying module 2 while improving ease in mechanical assembly at the other end of the humidifying module 2. In this case, the third packing wing 243 is spaced apart from the fourth packing wing 244 in the second insertion direction (direction indicated by arrow ID2). When the second packing member 24 is mechanically assembled, therefore, the third packing wing 243 is inserted earlier into the second insertion groove 2281 than the fourth packing wing 244. Consequently, it is possible to further improve ease in mechanical assembly of the second packing member 24 at the other end of the humidifying module 2.

The second packing member 24 may include a second reinforcing member 245.

The second reinforcing member 245 may be disposed in the second packing body 241. The second reinforcing member 245 may be formed so as to have greater strength than the second packing body 241. Consequently, the second reinforcing member 245 may prevent excessive deformation of the second packing body 241 due to the external pressure formed in the second outer space OS2. For example, the second reinforcing member 245 may be made of metal or plastic. The second reinforcing member 245 may be implemented so as to be disposed in the second packing body 241 through insert molding. The second reinforcing member 245 may be formed in a ring shape.

The second packing member 24 may include a second reinforcing member 246.

The second reinforcing protrusion 246 projects from the second reinforcing member 245. The second reinforcing protrusion 246 may project from the second reinforcing member 245 toward the second projecting member 242 so as to be located in the second projecting member 242. Consequently, the second reinforcing protrusion 246 may prevent excessive deformation of the second projecting member 242 due to pressing force applied during insertion of the second projecting member 242 into the second insertion groove 2281 and the external pressure formed in the second outer space OS2. The second reinforcing protrusion 246 may be formed so as to have greater strength than the second projecting member 242. For example, the second reinforcing protrusion 246 may be made of metal or plastic. The second reinforcing protrusion 246 may be implemented so as to be disposed in the second projecting member 242 through insert molding. The second reinforcing protrusion 246 may be formed in a ring shape. The second reinforcing protrusion 246 and the second reinforcing member 245 may be integrally formed.

The second packing member 24 may include a second catching member 247.

The second catching member 247 projects from the second packing body 241. The second catching member 247 may project from the second packing body 241 in the second insertion direction (direction indicated by arrow ID2). The second catching member 247 may be disposed opposite the second projecting member 242 in the state in which the second packing body 241 is interposed therebetween. In this case, the second packing body 241 may be located between the second catching member 247 and the second projecting member 242. When the second packing member 24 includes the second catching member 247, the mid-case 21 may include a second catching groove 216 (see FIG. 8). The second catching groove 216 may be formed in the outer wall of the mid-case 21, which surrounds the cartridge 22. When the second packing member 24 is coupled to the other end of the humidifying module 2 through mechanical assembly, the second catching member 247 may be inserted into the second catching groove 216. When the pressure in the second outer space OS2 is applied in the second insertion direction (direction indicated by arrow ID2), therefore, the second packing member 24 may be supported by the mid-case 21 through a catching structure using the second catching member 247, whereby it is possible to securely maintain isolation between the cartridge 22 and the mid-case 21. Each of the second catching member 247 and the second catching groove 216 may be formed in a ring shape. The second catching member 247 and the second packing body 241 may be integrally formed.

The second packing member 24 may include a second support groove 248.

The second support groove 248 is formed in the second catching member 247. The second support groove 248 may be formed in one surface of the second catching member 247 that contacts the mid-case 21. When the second packing member 24 includes the second support groove 248, the mid-case 21 may include a second support member 217. When the second packing member 24 is coupled to the other end of the humidifying module 2 through mechanical assembly, the second support member 217 may be inserted into the second support groove 248 to support the second catching member 247. Even though the pressure in the second outer space OS2 is applied in the second insertion direction (direction indicated by arrow ID2), therefore, it is possible to more securely maintain isolation between the cartridge 22 and the mid-case 21 by the second packing member 24. The second support member 217 may project from one surface of the mid-case 21 that contacts the second catching member 247.

Meanwhile, when the second cap 4 is coupled to the other end of the humidifying module 2 in the state in which the second packing member 24 is coupled to the other end of the humidifying module 2 through mechanical assembly, the second cap 4 may press the second packing body 241 toward the mid-case 21. Even though the pressure in the second outer space OS2 is applied in the second insertion direction (direction indicated by arrow ID2), therefore, it is possible to more securely maintain isolation between the cartridge 22 and the mid-case 21 by the second packing member 24 using pressing force of the second cap 4.

The present disclosure described above is not limited to the above embodiments and the accompanying drawings, and it will be obvious to a person having ordinary skill in the art to which the present disclosure pertains that various substitutions, modifications, and alterations are possible without departing from the technical idea of the present disclosure.

The invention claimed is:

1. A humidifier for fuel cells, the humidifier comprising:
a humidifying module configured to humidify dry gas supplied from outside using wet gas discharged from a fuel cell stack;
a first cap coupled to one end of the humidifying module; and
a second cap coupled to an opposite end of the humidifying module, wherein the humidifying module comprises:
a mid-case; and
at least one cartridge disposed in the mid-case, the cartridge being configured to receive a plurality of hollow fiber membranes,
the cartridge comprises:
an inner case having the hollow fiber membranes received therein;
a first potting layer configured to fix one end of each of the hollow fiber membranes; and
a first sub-case disposed so as to abut one end of the inner case and the first potting layer,
the humidifier further comprises a first packing member airtightly coupled to the one end of the humidifying module through mechanical assembly such that the first cap fluidly communicates with only the hollow fiber membranes,
the first sub-case comprises a first insertion groove configured to allow the first packing member to be inserted thereinto, and
the first packing member comprises:
a first packing body configured to isolate the mid-case and the inner case from each other; and
a first projecting member formed so as to project from the first packing body, the first projecting member being configured to be inserted into the first insertion groove.

2. The humidifier according to claim 1, wherein the first packing member comprises a first packing wing formed so as to project from the first projecting member, and
the first packing wing is inserted into the first insertion groove so as to come into tight contact with the first sub-case.

3. The humidifier according to claim 2, wherein the first packing wing is formed so as to extend from a first end coupled to the first projecting member to a second end spaced apart from the first projecting member in an inclined state such that an included angle between the first packing wing and the first projecting member is an acute angle.

4. The humidifier according to claim 2, wherein the first packing member comprises a second packing wing formed so as to project from the first projecting member, and the second packing wing and the first packing member are inserted into the first insertion groove so as to come into tight contact with the first sub-case in a state of being spaced apart from each other.

5. The humidifier according to claim 4, wherein the first packing wing is spaced apart from the second packing wing in a first insertion direction in which the first projecting member is inserted into the first insertion groove, and a projecting length of the first packing wing from the first projecting member is less than a projecting length of the second packing wing from the first projecting member.

6. The humidifier according to claim 4, wherein the second packing wing is formed so as to extend from a first end coupled to the first projecting member to a second end spaced apart from the first projecting member in an inclined state such that an included angle between the second packing wing and the first projecting member is an acute angle.

7. The humidifier according to claim 1, wherein the first packing member comprises a first reinforcing member located in the first packing body, and the first reinforcing member is formed so as to have greater strength than the first packing body.

8. The humidifier according to claim 7, wherein the first packing member comprises a first reinforcing protrusion formed so as to project from the first reinforcing member, and the first reinforcing protrusion projects from the first reinforcing member toward the first projecting member so as to be located in the first projecting member.

9. The humidifier according to claim 1, wherein the first projecting member is inserted into the first insertion groove in the same direction as a direction in which external pressure formed in an outer space between the first cap and the mid-case is applied to the first packing body.

10. The humidifier according to claim 1, wherein the mid-case comprises a first catching groove configured to allow the first packing member to be inserted thereinto, and the first packing member comprises a first catching member formed so as to project from the first packing body, the first catching member being configured to be inserted into the first catching groove.

11. The humidifier according to claim 10, wherein the first packing member comprises a first support groove formed in the first catching member, and the mid-case comprises a first support member configured to be inserted into the first support groove in order to support the first catching member.

* * * * *